June 23, 1964 R. A. ALCOTT ETAL 3,138,685
DUAL BIMETALLIC CONTROL THERMOSTAT
Filed April 12, 1961

INVENTORS
ROLLIN A. ALCOTT,
JOHN E. LUNDBERG
BY
Clyde C. Blinn
ATTORNEY

United States Patent Office 3,138,685
Patented June 23, 1964

3,138,685
DUAL BIMETALLIC CONTROL THERMOSTAT
Rollin A. Alcott, St. Louis, and John E. Lundberg, Richfield, Minn., assignors to Minneapolis-Honeywell Regulator Company, Minneapolis, Minn., a corporation of Delaware
Filed Apr. 12, 1961, Ser. No. 102,468
5 Claims. (Cl. 200—122)

The present invention is concerned with an improved temperature responsive control device or thermostat; in particular, the thermostat comprises a pair of bimetals which work together to provide a snap action for our switch so that a high capacity switch is operative with a minimum amount of bimetal and the design of the thermostat can be relatively small and appealing from the ornamental standpoint.

In the design of thermostats, the amount of active bimetal to operate a particular size load carrying switch is generally the main concern; however, when the size of the bimetal becomes large, the efficiency of the bimetal is lower and the ornamental aspects of the thermostat are difficult to maintain. In the present invention, the bimetal is split into two parts which operate together to operate the switch. The two sections of bimetal are spread apart so a central area between the bimetals is available for the switch and other components of the thermostat. By means of the split bimetal and the relative position of the bimetal and other components of the thermostat, the size, especially the thickness of the unit, is maintained relatively small.

An object of the present invention is to provide an improved thermostat which has a pair of bimetals so spaced to provide an inexpensive, operative design which lends itself to a pleasing ornamental design.

Another object of the present invention is to provide a thermostat having a calibration means wherein a cam rider and a cam are separated by a thin sheet of material to reduce the friction therebetween.

These and other objects of the present invention become apparent upon a study of the following specification and drawings of which:

Figure 1:
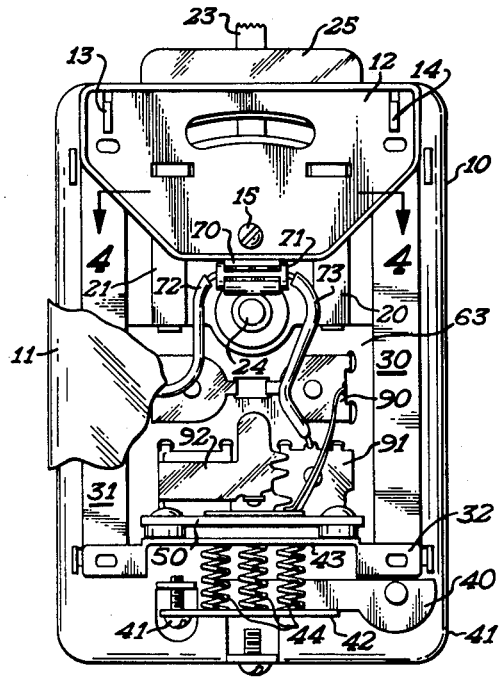
FIGURE 1 is a front view of the thermostat with a large portion of the cover cut away.
Figure 2:
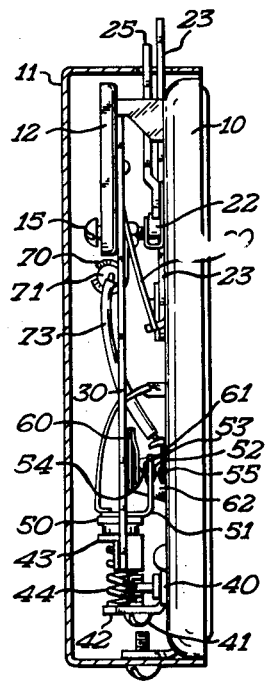
FIGURE 2 is a side view of the thermostat looking to the left of the thermostat as shown in FIGURE 1.

Referring to FIGURE 1 the thermostat or temperature responsive device has a base 10 to which a cover 11 can be attached to cover the mechanism of the device. A support member or element 12 which is pivotally attached to the base on a pair of projections 13 and 14 carries a calibration screw 15. Member 12 is biased about the pivots toward the base by a pair of springs 20 and 21. The springs 20 and 21 are connected at one end thereof to the base and at the other end to member 12 to bias member 12 counterclockwise as shown in FIGURE 2 so the end of screw 15 engages a calibration cam or wedge 22. Wedge 22 is attached to a lever 23 which is pivotally attached to base 10 by a riveted connection 24. Lever 23 extends beyond the upper end of the base through the cover to provide a means for setting the control point of the thermostat. Lever 23 is moved to coincide with the indicia on a scale plate 25.

Attached to support member 12 is a pair of bimetals 30 and 31. The bimetals are relatively long and straight, and they are rigidly connected at one end to member 12. A switch operating member 32 is connected to the other end of the bimetals to provide an assembly which comprises the support member 12, the two bimetals 30 and 31, and switch operating member 32 lying around the periphery of base 10. An open area is provided in the center of the assembly for other apparatus to be mentioned.

A lever 40 is attached to the lower end of the base. The position of lever 40 is adjusted by means of a screw 41. A projecting tab 42 on lever 40 extends away from the base to be parallel with a projecting tab 43 on switch operating member 32. Compressed between tabs 42 and 43 are a plurality of flat ended, coil springs 44. Springs 44 exert a compression force on bimetals 30 and 31 so the assembly made up of the support member 12, the bimetals, and switch operating member 32 is unstable in a center range of positions. The unstable range to or away from the base is selected by the compression force applied through springs 44 by screw 41. The ultimate position on either side of the center area is determined by associated stops which will be mentioned later in the specification.

Attached to switch operating member 32 is an insulator bar 50 which carries movable switch contact arm 51 having contacts 52 and 53 mounted thereon. Arm 51 with contacts 52 and 53 is positioned between a pair of fixed contacts 54 and 55 which are attached to press back springs 60 and 61, respectively. The contacts are attached to a ridged contact supporting member 62 connected to but insulated from the base by an insulating member 63 forming a portion of the base.

Attached to member 12 by a clamp 70 is an electric resistance heating element 71 which is connected into the switch circuit by a pair of electrical leads 72 and 73; so that, when current flows through resistance 71 to provide artificial heat to the thermostat, the heat is used for "heat anticipation" purposes.

The use of two bimetals 30 and 31 increases the distribution of bimetal in the air stream; in addition, the design lends itself to a better use of the space in the thermostat. The assembly of the two bimetals lies around the outer edges of the base so the center area is free for the other components of the thermostat. The switch heat and the heat of element 71 is equally distributed to the two bimetals. The design lends itself to a small flat housing which gives the unit a more pleasing appearance which can be very important in our aesthetic conscious society.

Figure 3:
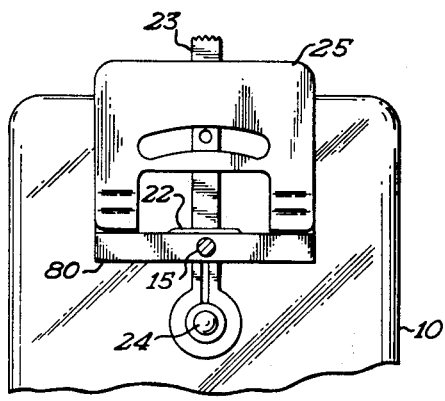
FIGURE 3 is a view of the calibration or control point setting apparatus with the projection or rider engaging the cam.
Figure 4:
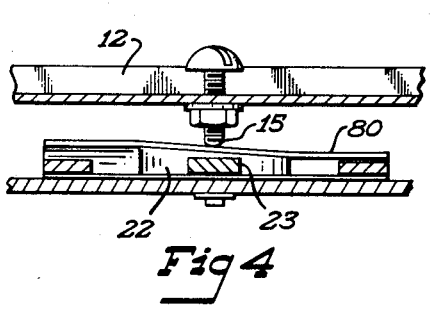
FIGURE 4 is a side view of the calibration apparatus shown in FIGURE 3 to specifically show the cam and the thin sheet of material interposed between the cam and the cam rider.

Referring to FIGURE 3, the set point adjustment lever 23 is shown for adjusting the position of cam or wedge 22 on which cam rider or screw 15 is biased. Interposed between the end of cam rider 15 and cam 22 is a thin sheet of metal, such as bronze, which is attached at its extreme ends to the base. As cam 22 is moved to the left or right as shown in FIGURE 4 to change the control point setting of the thermostat of FIGURE 1, cam rider 15 follows the cam surface but sheet 80 provides a relatively frictionless surface between the cam and the rider to prevent any galling action which might take place by rider 15. For example, without sheet 80, the end of screw 15 might dig into the surface of wedge 22 to change the calibration temperature of the thermostat. By means of the thin sheet of relatively frictionless material a calibration is made easier as wedge 22 will slide to the left or right as shown in FIGURE 4 even though the loading or force holding the end of screw 15 against the cam is relatively large.

Operation

When an electrical circuit is connected to the various terminals 90, 91, and 92, and the movable member 51 carrying contacts 52 and 53 as shown in FIGURE 1, an electrical circuit is completed to control associated heating or cooling apparatus. With the proper selection of bimetal elements 30 and 31, an increase in the temperature of the elements will cause the lower end of the elements and switch operating member 32 to move to the left as shown in FIGURE 2. The limit of movement of the assembly will be determined by the position of the fixed contact 54 when it is depressed by the movable contact 53. As a temperature changes in the reversed direction, and the bimetal elements 30 and 31 warp in the opposite direction, a force will be built up by the bimetals to overcome the force exerted on the assembly by the compression springs 44. When the force exerted by the bimetals is sufficient to overcome this compression force, the assembly will snap to the other side and the movable contact 52 will move to the right to engage stationary contact 55.

The temperature at which this movement will take place which determines the calibration of the thermostat is selected by the position of lever 23. A factory calibration of the unit is made by the position of screw 15; however, upon a movement of lever 23 to the left or right as shown in FIGURE 1, the temperature at which the switch will operate in one direction or the other to close a circuit comprising contacts 52 and 54 or contacts 53 and 55 is adjusted by the position of cam 22. When the cam is moved to the right as shown in FIGURE 4, the cam rider 15 raises one end of support member 12 about pivots 13 and 14. The movement of member 12 adjusts the fixed end of the bimetals and changes the temperature at which the other end of the bimetals will move switch operating member 32.

Interposed between wedge or cam 22 and cam rider 15 is a thin sheet of material 80 to reduce the friction and galling effect of the screw 15 on the cam. As cam 22 is moved to the right or to the left, projection 15 does not slide on the wedge itself but a stationary sheet of relatively low friction material is interposed therebetween.

By means of screw 41, the compression force exerted on switch operating member 32 and the assembly comprising the bimetals can be adjusted. By increasing the force or the compression force of the springs, the amount of force needed by the bimetals to switch the operator is increased. This additional force increases the differential of the thermostat and increases the switch loading force. The force system is such that the force developed by the bimetals must build up to equal the force of the springs. When the forces are equal, the assembly is unstable, and the assembly snaps to the other side. The unstable range can be increased by screw 41 to increase the force developed by springs 44. Upon an increase of the spring force, the temperature differential of the thermostat is increased.

Electric resistance heater 71 for providing artificial heat to the thermostat is connected to movable support member 12 by clamp 70. The heater is positioned in the center of the unit in between bimetal elements 30 and 31 so that the heat is equally distributed to the thermostat for heat anticipation purposes. By connecting the heater into the circuit by conductor 72 and 73, the heat available from resistance 71 can be used for anticipation purposes when the thermostat is either in the heating or cooling control range.

While the thermostat has been disclosed in one particular manner, the intention is to limit the scope of the invention only by the appended claims, in which we claim:

1. In a thermostat, a base adapted to be mounted on a vertical wall, a pair of bimetal elements, first means for pivotally mounting one end of said bimetals to an upper end of said base so that said bimetal elements extend along the sides and toward a lower end of said base, said elements having a plane of the junction of the two metals in a plane substantially parallel to said base, a switch contact carrying member connected to the opposite ends of said bimetal elements, a plurality of flat ended coil springs, means for mounting said springs in compression between said switch contact carrying member and said base to place said bimetal elements in compression whereby upon a change in the temperature of said bimetal elements said switch contact carrying member moves away from said base in a snap action manner, a switch mounted on said base in a space circumvented by an assembly made up of said first means, said elements, and said switch carrying member, said switch comprising a movable contact mounted on said carrying member and a stationary contact mounted on said base, and means mounted on said base for varying the position of said first means with respect to said base so the temperature required to cause said elements to close said switch contacts can be selected.

2. A temperature responsive device comprising, a base, an element support member pivotally connected to an upper end of said base, said support member having a projection extending toward said base, a wedge shaped cam member movably mounted between said base and said projection, means resiliently biasing said support member against said cam member whereby the position of said support member can be selected by moving said cam, a thin member fixed to said base and lying between said projection and said cam whereby upon movement of said cam said thin member prevents said projection from galling said cam, a pair of temperature responsive elements connected to said support member and extending along each side to a lower end of said base, an operating member connected to the lower ends of said responsive elements to form an assembly made of said support member, said elements, and said operating member, a plurality of flat ended coil springs, a projection on said base, said springs being mounted between said projection and said operating member to place a compression force on said assembly whereby said operating member is unstable in a predetermined center area and moves to and away from said center area in a snap action manner, a switch, said switch being mounted on said base in a center area of said assembly means and associated with said operating member for closing said switch when said member moves in one direction from said center position, and an electric resistance heater mounted on said support member adjacent said center area and adapted to provide artificial heat to said elements for heat anticipation.

3. In a thermostat, a base adapted to be mounted on a vertical wall, a pair of bimetal elements, first means for pivotally mounting one end of said bimetal elements to an upper end of said base so that said bimetal elements extend along the sides and toward a lower end of said base, said elements providing movement at their lower ends toward and away from said base with respect to said first means as the temperature of said elements change, a switch operating member connected to the lower ends of said bimetal elements, a flat ended coil spring, means for mounting said spring in compression between said switch operating member and said base to place said bimetal elements in compression whereby upon a change in the temperature of said bimetal elements said switch operating member moves away from said base in an over-center snap action manner, a switch mounted on said base in a space between said bimetal elements, said switch being operated by said operating member and means mounted on said base for varying the position of said first means with respect to said base so the temperature required to cause said elements to close said switch contacts can be selected.

4. A temperature responsive device comprising, a base, an element support member pivotally connected to an upper end of said base, said support member having an adjustable projection extending toward said base, a wedge member movably mounted between said base and said projection, means resiliently urging said projection against said wedge member whereby the position of said support member can be selected by moving said wedge member, a thin sheet of metal fixed to said base, said sheet being held between said projection and said wedge whereby upon movement of said wedge said sheet reduces the friction between said projection and said wedge, a pair of temperature responsive elements connected to said support member and extending along each side to a lower end of said base, a switch actuating member connected to the lower ends of said responsive elements to form an assembly made of said support member, said elements and said actuating member, resilient means engaging said actuating member to place a compression force on said assembly whereby said actuating member is unstable in one position and moves to and away from said one position in a snap action manner, a switch mounted on said operating member for closing said switch when said member moves in one direction from said one position.

5. In a thermostat, a base, a pair of bimetal elements, support means for pivotally mounting one end of said bimetals to an upper end of said base so that said bimetal elements extend along the sides and toward a lower end of said base, said elements moving perpendicular to said base, a switch actuating member connected to the opposite ends of said bimetal elements to join said bimetals in a composite assembly, a compressed spring, means for mounting said spring between said switch member and said base to place said bimetal elements in compression whereby said actuating member is stable in a first and a second position, a switch mounted on said base, means connecting said switch and said actuating member so said switch is closed in one of said positions, and calibration means mounted on said base for varying the position of said first means with respect to said base.

References Cited in the file of this patent

UNITED STATES PATENTS

| | | |
|---|---|---|
| 2,171,272 | Kronmiller et al. | Aug. 29, 1939 |
| 2,332,471 | Rickmeyer | Oct. 9, 1943 |
| 2,374,097 | Holmes | Apr. 17, 1945 |
| 2,930,874 | Andrews | Mar. 29, 1960 |